United States Patent Office 3,748,213
Patented July 24, 1973

3,748,213
ACOUSTIC LININGS
Anthony George Kitching, Duffield, and Mervyn Brown, Ticknall, England, assignors to Rolls-Royce Limited, Derby, England
Filed Mar. 15, 1971, Ser. No. 124,057
Claims priority, application Great Britain, Mar. 13, 1970, 12,058/70
Int. Cl. B32b 3/12; G10k 11/04
U.S. Cl. 161—68                         5 Claims

ABSTRACT OF THE DISCLOSURE

An acoustic lining which can be applied to parts of a gas turbine jet engine where noise attenuation is required. The acoustic lining comprises a core member sandwich between an impervious sheet and a perforate sheet. The core member comprises a plurality of elongate alternately arranged substantially V-shaped cells, and diamond-shaped cells.

---

This invention relates to acoustic linings for attenuating the noise produced by engines such as gas turbine engines. The linings may for example be used to line the by-pass duct of a fan engine or the turbine exhaust and intake of such an engine.

According to the present invention an acoustic lining comprises a core member sandwiched between a imperforate sheet and a perforate sheet member, the core member comprising a plurality of elongate alternately arranged substantially V-shaped cells and diamond-shaped cells.

Preferably some of the walls defining the cells are impervious whilst the remainder of the cell walls are porous.

Preferably the core member comprises two corrugated sheet members laid back to back to define the cells.

Preferably each alternate cell wall is blanked off, the remaining cell walls being porous.

Preferably the lining may be in the form of an annulus or part annulus, the cells extending around the periphery of the annulus.

Preferably the imperforate sheet member, the perforate sheet member and the core member are made from a glass reinforced plastic material.

Alternatively preferably the imperforate member, the perforate member and the core member are made from a metallic material.

Figure 1:
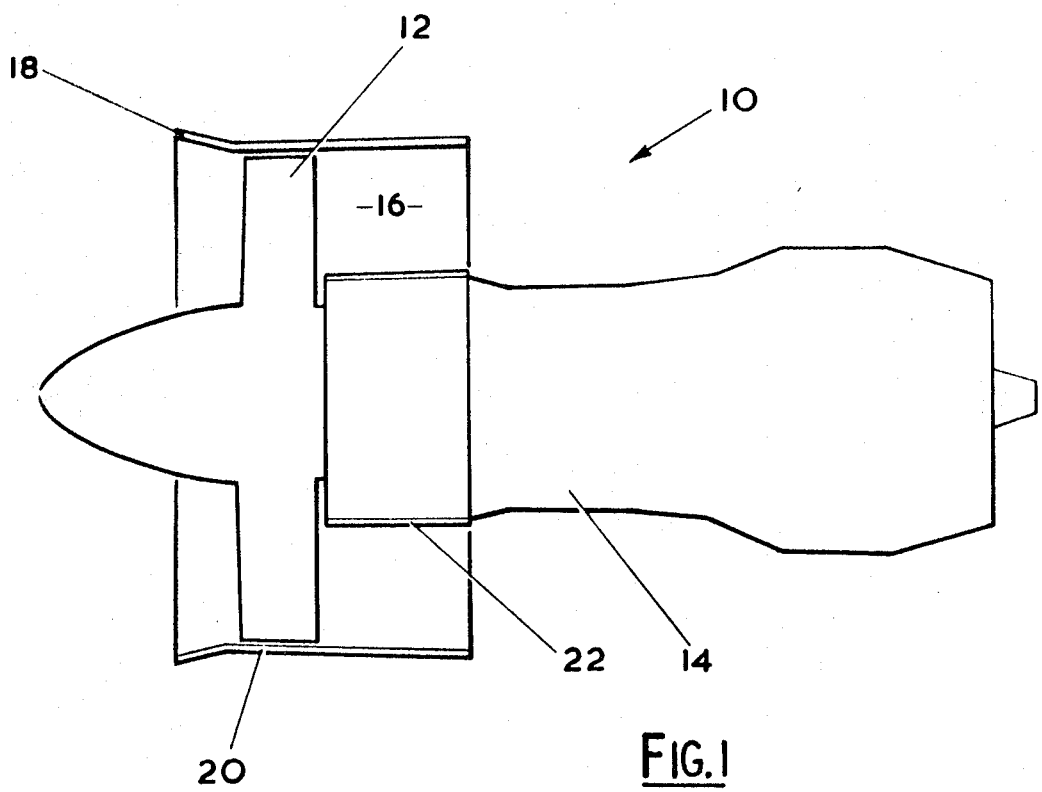
Figure 2:
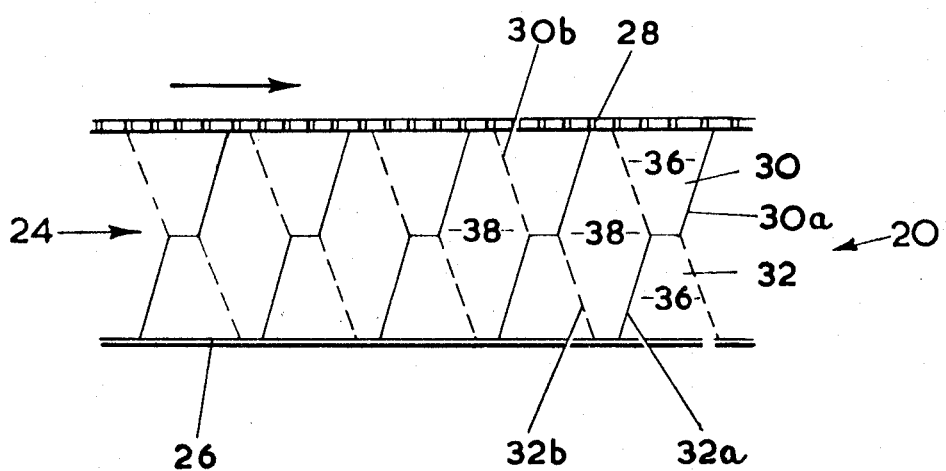

The present invention will now be more particularly described with reference to the accompanying drawing in which:

FIG. 1 shows a gas turbine engine incorporating one form of acoustic lining according to the present invention and FIG. 2 is an enlarged view of a section of the acoustic lining shown in FIG. 1.

Referring to the figures, a gas turbine engine 10 is of the front fan type having a fan 12 and compressor means 14 and the fan is mounted for rotation in a duct 16 which is defined by a casing 18. An acoustic lining 20 is mounted in the duct 16 and a further lining 22 surrounds the compressor means 14.

Referring more particularly to FIG. 2 the lining 20 comprises a core 24 which is sandwiched between an impervious sheet 26 and a perforate sheet 28. The impervious sheet 26 consists of a layer of glass reinforced plastics and the sheet 28 consists of a glass reinforced plastics perforate layer on the top of a further layer of glass reinforced plastics made in accordance with our British Pat. 1,274,871. The core 24 comprises two corrugated sheets 30 and 32 which are laid back to back to form substantially elongate V-shaped cells 36 and diamond shaped cells 38. Alternate walls 30a and 32a of the sheets 30 and 32, respectively, are blanked off whilst the remaining walls 30b and 32b are porous.

Whilst the core 24 and the sheets 26 and 28 have been described as being made of glass reinforced plastics they can alternatively be made of a metal if the environment in which the lining is to operate so requires.

Although the invention has been described in relation to the bypass duct lining and the compressor casing of a jet engine, it can equally well be applied to any other part of a gas turbine engine where noise attenuation is required. Its use is not restricted to gas turbine engines, e.g. any duct in which a gas is flowing or for enclosing a space in which noise is generated.

What is claimed is:

1. An acoustic lining comprising a core member positioned and sandwiched between an imperforate sheet member on one side, and a perforate sheet member on the other side, the core member comprising two corrugated sheet members, one wall of each of the corrugated sheet members being porous and the other adjacent, opposing wall thereof being solid and non-porous, the two corrugated sheet members positioned back to back to define therebetween a plurality of elongate substantially V-shaped cells alternating with a plurality of elongated substantially diamond-shaped cells, the two corrugated sheet members so positioned that one of the two opposing walls of the V-shaped cells being porous and the other wall being solid, and two opposing walls of the four walls of the diamond-shaped cells being porous and the other two opposing walls are solid.

2. An acoustic lining as claimed in claim 1 in which the lining forms an annulus or partial annulus, the cells in the core member extending around the periphery of said annulus.

3. An acoustic lining as claimed in claim 1 in which the imperforate sheet member, the perforate sheet member and the core member are glass reinforced plastic material.

4. An acoustic lining as claimed in claim 1 in which the imperforate sheet member, the perforate sheet member, and the core member are a metallic material.

5. An acoustic lining as claimed in claim 1 as a noise-attenuating part of a gas turbine engine.

References Cited

UNITED STATES PATENTS

| | | | |
|---|---|---|---|
| 3,533,206 | 10/1970 | Passeno | 52—387 |
| 3,516,895 | 6/1970 | Hartman | 161—68 |
| 3,589,972 | 6/1971 | Greig et al. | 161—68 |
| 2,994,401 | 8/1961 | Bourne et al. | 161—109 X |
| 3,380,206 | 4/1968 | Barnett | 52—145 |
| 3,422,921 | 1/1969 | Warnaka | 181—33 G |
| 3,544,417 | 12/1970 | Corzine | 161—50 |
| 3,669,820 | 6/1972 | Fredericks | 161—68 |
| 3,689,345 | 9/1972 | Figge et al. | 161—68 |

HAROLD ANSHER, Primary Examiner

U.S. Cl. X.R.

52—144, 145; 161—113, 137, 161; 181—33 G; 252—62